(12) United States Patent
Ohmori et al.

(10) Patent No.: US 7,401,762 B2
(45) Date of Patent: Jul. 22, 2008

(54) SOLENOID-OPERATED VALVE FOR USE WITH FUEL CELLS

(75) Inventors: Hiroto Ohmori, Shioya-gun (JP); Kouetsu Hikichi, Kakuda (JP); Takahide Kato, Shioya-gun (JP); Masakazu Murai, Portage, MI (US); Narihiro Takagi, Haga-gun (JP); Ryoichi Yoshitomi, Haga-gun (JP); Koji Matsumoto, Haga-gun (JP)

(73) Assignee: Keihin Corporation, Tokyo (JP)

( * ) Notice: Subject to any disclaimer, the term of this patent is extended or adjusted under 35 U.S.C. 154(b) by 79 days.

(21) Appl. No.: 11/291,714

(22) Filed: Nov. 30, 2005

(65) Prior Publication Data

US 2006/0131531 A1 Jun. 22, 2006

(30) Foreign Application Priority Data

Nov. 30, 2004 (JP) ............................. 2004-347666

(51) Int. Cl.
*F16K 39/00* (2006.01)
(52) U.S. Cl. .................. 251/282; 251/129.15; 137/340
(58) Field of Classification Search ........... 251/129.15, 251/281, 282; 137/340; 123/361, 399, 339.1
See application file for complete search history.

(56) References Cited

U.S. PATENT DOCUMENTS 3,967,808 A * 7/1976 Lieding ....................... 251/46
4,582,294 A * 4/1986 Fargo ...................... 251/129.15
4,623,002 A * 11/1986 Schoonover et al. ...... 137/625.48
5,941,502 A * 8/1999 Cooper .................... 251/129.15
6,152,421 A * 11/2000 Suzuki .................... 251/129.15
6,380,832 B2 * 4/2002 Oyama et al. ............... 335/281
6,631,881 B2 * 10/2003 Weldon et al. .......... 251/129.02
7,048,252 B2 * 5/2006 Shibata ................... 251/129.15

FOREIGN PATENT DOCUMENTS

JP 2004-183681 7/2004

* cited by examiner

*Primary Examiner*—John K. Fristoe, Jr.
(74) *Attorney, Agent, or Firm*—Lahive & Cockfield, LLP; Anthony A. Laurentano, Esq.

(57) ABSTRACT

A solenoid-operated valve for use with fuel cells has a valve housing made of aluminum, for example and having first through third heating medium passages defined therein. A valve seat disposed in and fastened to the valve housing is made of stainless steel, for example. A valve head has a disk which can be seated on and unseated off a valve seat member of a valve seat. The valve head is coupled by threaded surfaces to the distal end of a movable member which is displaceable when a solenoid is energized. The movable member is made of a magnetic metallic material, and the valve head is made of a corrosion-resistant metallic material such as stainless steel or the like, for example.

15 Claims, 4 Drawing Sheets

SOLENOID-OPERATED VALVE FOR USE WITH FUEL CELLS

BACKGROUND OF THE INVENTION

1. Field of the Invention

The present invention relates to a solenoid-operated valve for discharging a reaction gas and/or residual water from fuel cells of a fuel cell system.

2. Description of the Related Art

Solid polymer membrane fuel cell devices have a stack of cells each comprising a solid polymer electrolyte membrane sandwiched between an anode and a cathode that are disposed one on each side of the solid polymer electrolyte membrane. For operating such a stack of cells, hydrogen is supplied as a fuel to the anode and air is supplied as an oxidizing agent to the cathode. Hydrogen ions are generated at the anode by a catalytic reaction, and move through the solid polymer electrolyte membrane to the cathode where they cause an electrochemical reaction to generate electric power.

A fuel cell system including the above stack has an air compressor for supplying air as a reaction gas to the cathodes and a pressure control valve for supplying hydrogen as a reaction gas to the anodes under a pressure depending on the pressure of the air that is used as a signal pressure. In the fuel cell system, the pressure of the reaction gas supplied to the anodes with respect to the pressure of the reaction gas supplied to the cathodes is adjusted to a predetermined pressure for thereby achieving a predetermined power generation efficiency, and the flow rates of the reaction gases supplied to the fuel cell stack are controlled to obtain a desired fuel cell output.

Japanese Laid-Open Patent Publication No. 2004-183681 discloses a discharge valve for discharging a reaction gas and/or residual water from fuel cells, the discharge valve being disposed at an appropriate position in either an air discharge passage interconnecting an air discharge port and an air discharger or a passage between a hydrogen discharger and a hydrogen discharge port.

SUMMARY OF THE INVENTION

It is a primary object of the present invention to provide a solenoid-operated valve for use with fuel cells which is highly durable.

Another object of the present invention is to provide a solenoid-operated valve for use with fuel cells which can be manufactured with a good yield.

Still another object of the present invention is to provide a solenoid-operated valve for use with fuel cells which can be constructed at a low cost.

According to the present invention, there is provided a solenoid-operated valve for discharging a reaction gas and/or residual water from fuel cells, comprising a valve housing having an inlet port for introducing the reaction gas and/or residual water and an outlet port for discharging the reaction gas and/or residual water introduced from the inlet port, the valve housing having a communication chamber defined therein between the inlet port and the outlet port, a valve seat disposed in the communication chamber and coupled to the valve housing, a solenoid housing coupled to the valve housing, a solenoid disposed in the solenoid housing for being energized by an electric current supplied thereto, a fixing member disposed in the solenoid, a movable member having an end facing the fixing member, the movable member being displaceable toward or away from the fixing member when the solenoid is energized, a valve head coupled to an opposite end of the movable member, the valve head being seatable on or away from the valve seat when the movable member is displaced, and a guide member disposed in the valve housing and the solenoid and having a guide hole, the movable member being inserted in the guide hole, the guide member having an engaging portion for limiting the valve head against displacement in a direction away from the valve seat.

In conventional solenoid-operated valves, the valve seat is integrally formed with the valve housing as part of the valve housing. The valve housing is made of stainless steel or the like to prevent the valve seat from being corroded. However, the valve housing made of stainless steel is generally heavy.

According to the present invention, since the valve housing and the valve seat are separate members, the valve housing may be made of lightweight aluminum, and the valve seat may be made of inexpensive corrosion-resistant stainless steel or the like. Consequently, the solenoid-operated valve is light in weight, is sufficiently durable, and is manufactured at a reduced cost.

As the valve housing and the valve seat are separate members, the valve seat may be coated with a water-repellant coating or otherwise processed before the valve seat is coupled to the valve housing. The water-repellant coating applied to the valve seat is effective to prevent water from being frozen on the valve seat in the solenoid-operated valve.

In conventional solenoid-operated valves, the valve head is usually integrally formed with the movable member as a unitary member. Because the movable member is made of a magnetic metallic material so that it can be displaced when the solenoid is energized, the valve head is of necessity made of the magnetic metallic material.

According to the present invention, the movable member and the valve head are separate members. Therefore, the valve head may be made of an inexpensive metallic material to reduce the cost of the solenoid-operated valve.

If the valve head is made of a corrosion-resistant metallic material, then the valve head is sufficiently durable in applications where the solenoid-operated valve is used to discharge residual water from a fuel cell system. Therefore, the solenoid-operated valve has a prolonged service life.

Even when the valve seat and the valve head suffer aging, the valve seat and the valve head only need to be replaced. The running cost of the solenoid-operated valve is lower than would be with conventional solenoid-operated valves where the valve housing or the movable member needed to be replaced in its entirety.

The movable member is of a relatively simple shape such as a cylindrical shape. Therefore, the movable member can be handled more easily than a conventional movable member integrally formed with a valve head of complex shape. When a fluorine coating is to be applied to the circumferential side wall of the movable member, for example, it is easy to prevent hit marks and scratches from being formed on the movable member. Consequently, the solenoid-operated valve can be manufactured with an increased yield.

The movable member and the valve head should preferably be coupled to each other by threaded surfaces thereof. When the valve head needs to be replaced due to aging thereof, the valve head can easily be replaced by being removed from the movable member.

Preferably, the movable member has a first inner hole defined axially therein and a second inner hole defined diametrically therein in communication with the first inner hole, and the valve head has a third inner hole defined axially therein in communication with the first inner hole and a fourth inner hole defined diametrically therein in communication with the second inner hole and the third inner hole. When the movable member is displaced in a direction toward the fixing member, a fluid that is present in a clearance between the movable member and the fixing member is quickly discharged therefrom through the first to fourth inner holes. When the movable member is displaced in a direction away from the fixing member, a fluid quickly flows through the first to fourth inner holes into the clearance between the movable member and the fixing member. Therefore, the movable member is displaced at an increased speed, and the speed of response of the solenoid-operated valve is increased.

No communication passage is defined in a circumferential side wall of the movable member. Therefore, the area of a magnetic path provided by the movable member is not reduced. Therefore, necessary forces are achieved for displacing the movable member and hence the valve head.

The valve housing should preferably be made of aluminum or aluminum alloy, and the valve seat should preferably be made of a material different from the valve housing. Preferably, the valve seat should be made of stainless steel.

The valve housing should preferably have a heating medium passage defined therein for passage of a heating medium therethrough. Since the heating medium flows through the valve housing, even if a wet reaction gas or residual water is introduced into the solenoid-operated valve when a fuel cell system incorporating the solenoid-operated valve operates at low temperatures, no water is frozen in the solenoid-operated valve.

The valve housing should preferably have a plurality of straight heating medium passages defined therein because the straight heating medium passages can easily be formed in the valve housing. Stated otherwise, the heating medium passages can be formed in the valve housing without a complex machining process.

The heating medium passages extend perpendicularly to each other in surrounding relation to the communication chamber. The heating medium flowing through those heating medium passages is capable of efficiently heating the communication chamber.

One of the straight heating medium passages may have an opening at an end thereof at an end face of the valve housing. The opening may be closed by a closure member for preventing the heating medium from leaking out of the heating medium passages.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
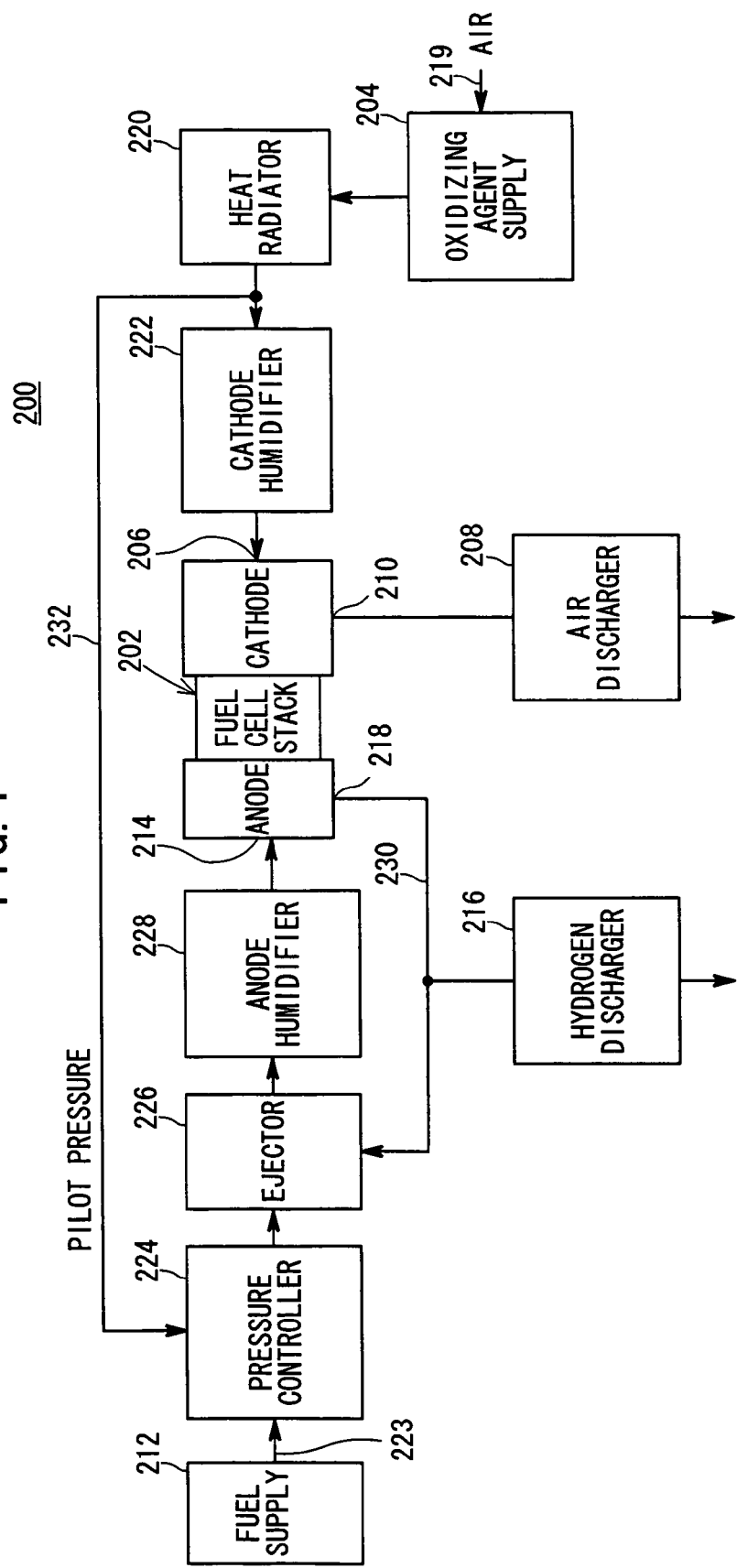
FIG. 1 is a block diagram of a fuel cell system which incorporates a solenoid-operated valve for fuel cells according to an embodiment of the present invention.

FIG. 1 is a block diagram of a fuel cell system 200 which incorporates a solenoid-operated valve for use with fuel cells according to an embodiment of the present invention. The fuel cell system 200 is mounted on a vehicle such as an automobile or the like.

As shown in FIG. 1, the fuel cell system 200 includes a fuel cell stack 202 having a stack of cells each comprising a solid polymer electrolyte membrane, such as a polymer ion exchange membrane or the like, sandwiched between an anode and a cathode that are disposed one on each side of the polymer electrolyte membrane.

The cathode of each cell is supplied with air containing oxygen as an oxidizing agent, and the anode of each cell with hydrogen as a fuel. The fuel cell stack 202 has a cathode having an air supply port 206 for being supplied with air from an oxidizing agent supply 204 and an air discharge port 210 connected to an air discharger 208 for discharging air in the cathode. The fuel cell stack 202 also has an anode having a hydrogen supply port 214 for being supplied with hydrogen from a fuel supply 212 and a hydrogen discharge port 218 connected to a hydrogen discharger 216. A reaction gas used in the embodiment collectively refers to hydrogen, air, or excessive hydrogen.

To an air supply passage 219 connected to the air supply port 206, there are connected the oxidizing agent supply 204, a heat radiator 220, and a cathode humidifier 222 that are arranged successively from an upstream region of the air supply passage 219.

The oxidizing agent supply 204 comprises, for example, a supercharger (compressor) and a motor for actuating the supercharger (not shown). The oxidizing agent supply 204 adiabatically compresses air, which contains oxygen to be used as an oxidizing gas in the fuel cell stack 202, and delivers the compressed air. When the air is adiabatically compressed, it is heated. The heated air is effective to warm the fuel cell stack 202.

The heat radiator 220 comprises an intercooler (not shown), for example. The air supplied from the oxidizing agent supply 204 is cooled by a heat exchange with cooling water which flows through a flow passage in the heat radiator 220. Therefore, the air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to supply water to the solid polymer electrolyte membranes of the fuel cell stack 202, thereby keeping the ion conductivity of the solid polymer electrolyte membranes at a certain value or higher.

To a hydrogen supply passage 223 connected to the hydrogen supply port 214, there are connected the fuel supply 212, a pressure controller 224, an ejector 226, and an anode humidifier 228 that are arranged successively from an upstream region of the hydrogen supply passage 223. The hydrogen discharger 216 is connected to the hydrogen discharge port 218 by a circulation passage 230.

The fuel supply 212 comprises a hydrogen gas container (not shown) for supplying hydrogen as a fuel to the fuel cells, for example. The fuel supply 212 stores hydrogen that is to be supplied to the anode of the fuel cell stack 202.

The pressure controller 224 comprises a pneumatic proportional pressure control valve, for example.

The pressure controller 224 is supplied with air through a pressure control bypass passage 232. Specifically, air supplied from the oxidizing agent supply 204 is set to a certain pressure depending on a load on the fuel cell stack 202, an operated amount of an accelerator pedal, not shown, or the like, and then introduced into the fuel cell stack 202. At this time, there is a need for regulating the pressure of hydrogen. Using the pressure of air from the pressure control bypass passage 232 as a pilot pressure (signal pressure), the pressure controller 224 sets a secondary pressure as its outlet pressure to a pressure in a predetermined range corresponding to the pilot pressure.

As can be understood from FIG. 1, the pressure controller 224 is supplied with the air that has been cooled by the heat radiator 220.

The ejector 226 comprises a nozzle and a diffuser (not shown). The hydrogen supplied from the pressure controller 224 is accelerated when it passes through the nozzle, and ejected toward the diffuser. When the hydrogen flows at a high speed from the nozzle to the diffuser, a negative pressure is developed in an auxiliary chamber disposed between the nozzle and the diffuser, attracting the hydrogen discharged from the anode through the circulation passage 230. The hydrogen and the discharged hydrogen that are mixed together by the ejector 226 are supplied to the anode humidifier 228. The hydrogen discharged from the fuel cell stack 202 circulates through the ejector 226.

Therefore, the unreacted hydrogen discharged from the hydrogen discharge port 218 of the fuel cell stack 202 is introduced through the circulation passage 230 into the ejector 226. The hydrogen supplied from the pressure controller 224 and the hydrogen discharged from the fuel cell stack 202 are mixed with each other and supplied to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is also supplied to the fuel cell stack 202 to keep the ion conductivity of the solid polymer electrolyte membranes of the fuel cell stack 202 at a certain value or higher.

The hydrogen discharger 216 which has a discharge control valve, not shown, is connected to the hydrogen discharge port 218 by the circulation passage 230. The discharge control valve can be opened and closed depending on an operating state of the fuel cell stack 202 for discharging, out of the vehicle, excessive water (mainly liquid water) in a discharged gas which has been separated by a reservoir tank, not shown.

In the fuel cell stack 202 thus arranged, hydrogen ions that are generated at the anode by a catalytic reaction move through the solid polymer electrolyte membrane to the cathode where the hydrogen ions and oxygen cause an electrochemical reaction to generate electric power.

The solenoid-operated valve for use with fuel cells according to the embodiment of the present invention is connected to an appropriate position in an air discharge passage interconnecting the air discharge port 210 and the air discharger 208 and/or a passage between the hydrogen discharger 216 and the hydrogen discharge port 218 in the fuel cell system 200 which is constructed as described above. The solenoid-operated valve serves to discharge a reaction gas and/or residual water. The solenoid-operated valve may be incorporated in the air discharger 208 and/or the hydrogen discharger 216. Alternatively, the solenoid-operated valve may be incorporated in an air branch line (not shown) branched from the heat radiator 220 for delivering air to a suitable mechanism shown in FIG. 1.

Figure 2:
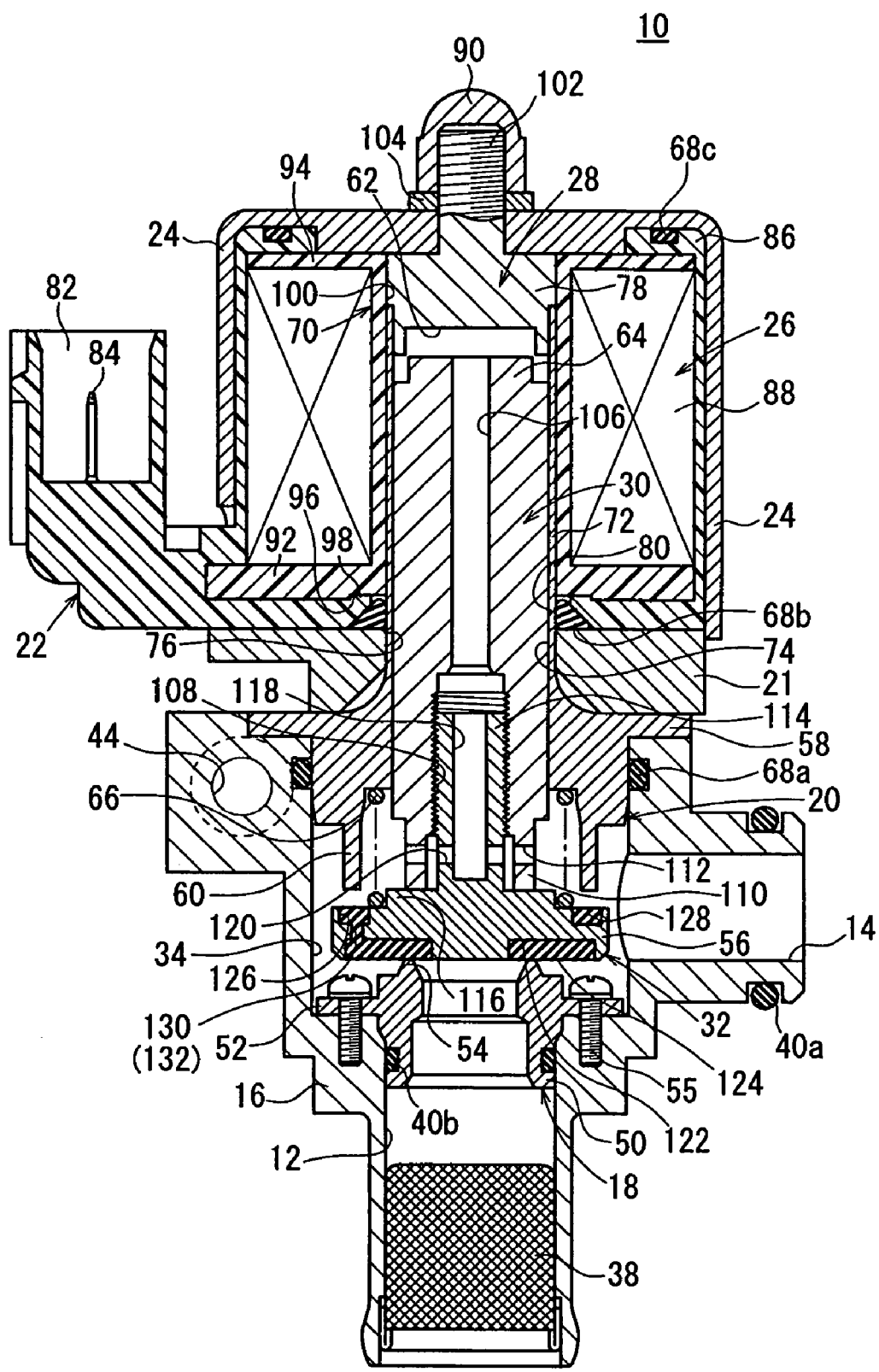
FIG. 2 is a vertical cross-sectional view taken along line II-II of FIG. 3, showing the solenoid-operated valve as it is closed.

FIG. 2 shows in vertical cross section the solenoid-operated valve for use with fuel cells according to the embodiment of the present invention. The solenoid-operated valve, which is generally denoted by 10 in FIG. 2, comprises a valve housing 16 having an inlet port 12 and an outlet port 14, a valve seat 18 fastened in position in the valve housing 16, a solenoid housing 24 having a substantially inverted U-shaped cross section which is connected to an upper end of the valve housing 16 by a guide member 20, a plate member 21, and a cover member 22, a solenoid 26 disposed in the solenoid housing 24, a fixing member 28 disposed in the solenoid 26, a movable member 30 movable toward and away from the fixing member 28 and displaceably inserted in the guide member 20, and a valve head 32 coupled to an end of the movable member 30. The guide member 20 serves to limit the amount of displacement of the valve head 32.

The valve housing 16 is made of aluminum or aluminum alloy, and has a communication chamber 34 extending from the inlet port 12 in an upstream region to the outlet port 14 in a downstream region and providing fluid communication between the inlet port 12 and the outlet port 14. If the solenoid-operated valve 10 is incorporated in an air supply passage of the cathode humidifier 222 (see FIG. 1) or a hydrogen supply passage of the anode humidifier 228 (see FIG. 1), then a reaction gas and/or residual water that has passed through the air supply passage or the hydrogen supply passage is introduced from the inlet port 12 into the communication chamber 34 and then discharged from the communication chamber 34 through the outlet port 14.

The inlet port 12 is defined in a tubular member projecting downwardly from a lower end face of the valve housing 16. A filter 38 is mounted in the inlet port 12 and has a bottom facing the communication chamber 34. Dust particles and other foreign matter contained in a reaction gas and/or residual water introduced from the inlet port 12 are removed by the filter 38 against entry into the communication chamber 34.

The outlet port 14 is defined in a tubular member projecting from a side face of the valve housing 16 substantially perpendicularly to the axis of the inlet port 12. A tube (not shown) or the like is connected to the outlet port 14 by a joint, for example. The outlet port 14 is sealed against fluid leakage by an annular seal 40a inserted in an annular groove that is defined in the outer circumferential surface of the tubular member which defines the outlet port 14.

Figure 3:
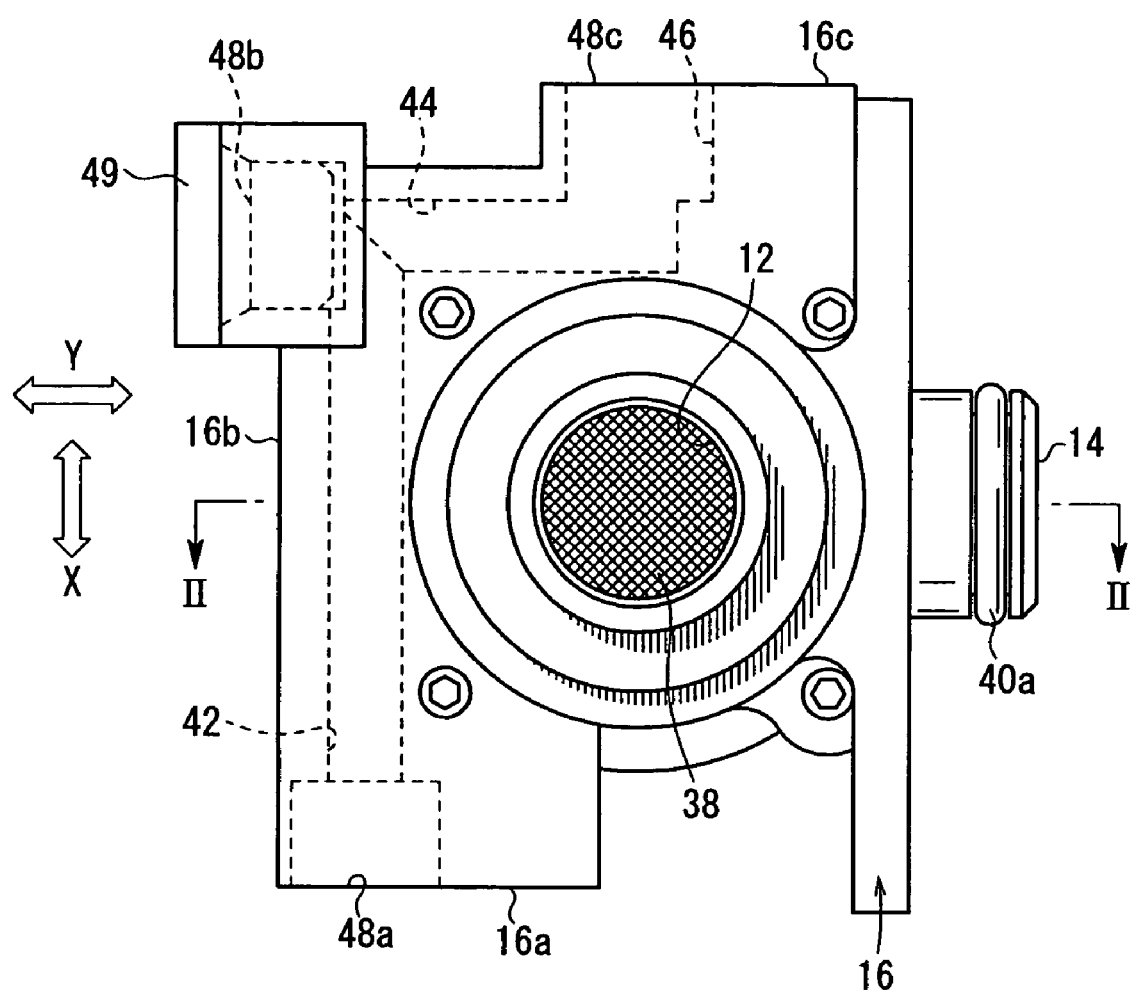
FIG. 3 is a bottom view of the solenoid-operated valve shown in FIG. 2.

The lower end face of the valve housing 16 is shown in FIG. 3. As shown in FIG. 3, the valve housing 16 has a first heating medium passage 42, a second heating medium passage 44, and a third heating medium passage 46 which are defined therein for passing a heating medium therethrough. The first heating medium passage 42 and the third heating medium passage 46 extend in the direction indicated by the arrow X, and the second heating medium passage 44 extends in the direction indicated by the arrow Y which is perpendicular to the direction indicated by the arrow X. Stated otherwise, the second heating medium passage 44 extends perpendicularly to the first heating medium passage 42, and the third heating medium passage 46 extends perpendicularly to the second heating medium passage 44.

Figure 4:
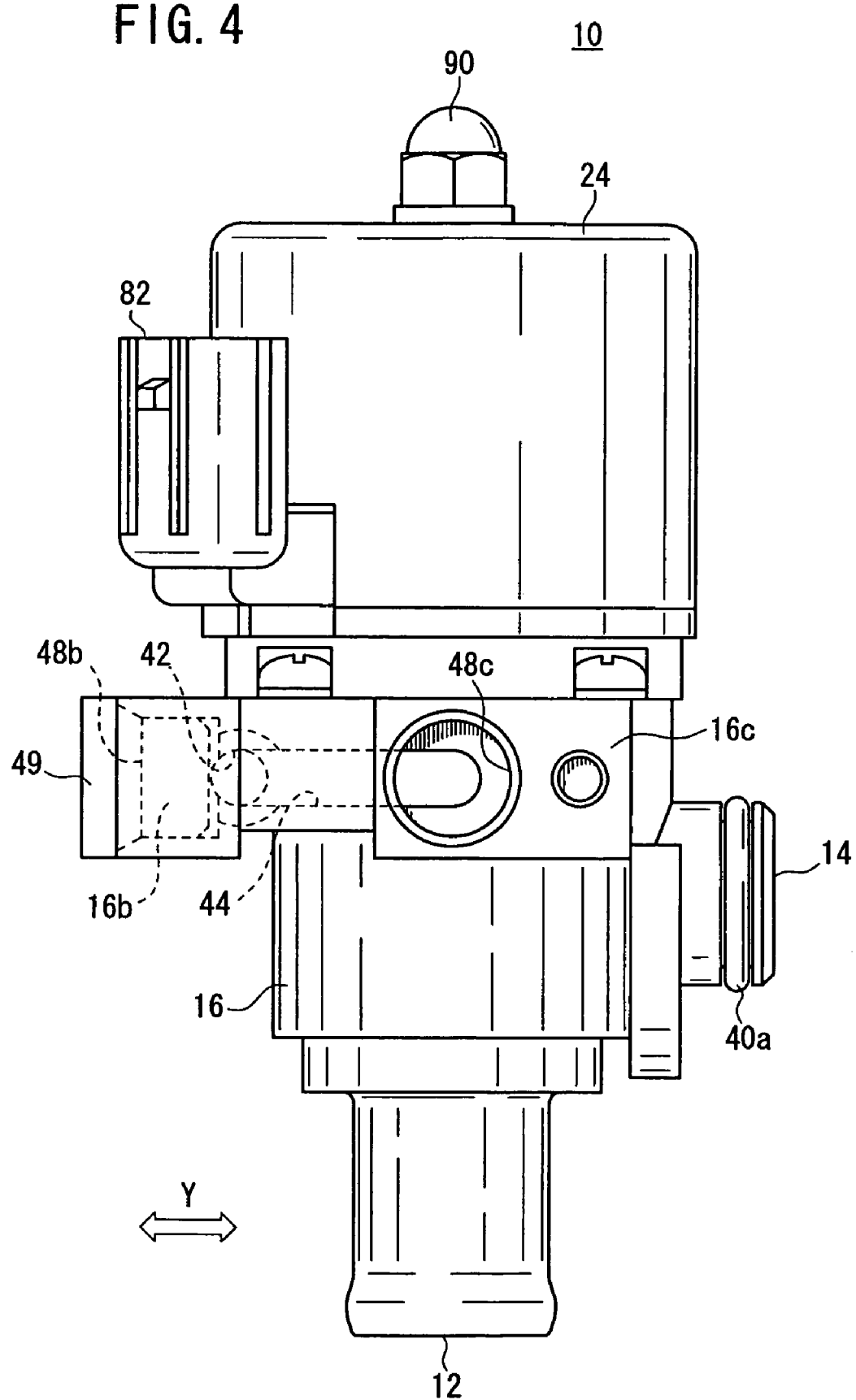
FIG. 4 is a front elevational view of the solenoid-operated valve shown in FIG. 2.

As can be seen from FIGS. 2 and 4, the first heating medium passage 42 and the second heating medium passage 44 are disposed at substantially the same height in the vicinity of the distal end of the guide member 20 inserted in the valve housing 16, and extend around the communication chamber 34. Therefore, a reaction gas and/or residual water introduced into the communication chamber 34 is reliably heated by the heating medium flowing through the first heating medium passage 42 and the second heating medium passage 44.

The first heating medium passage 42, the second heating medium passage 44, and the third heating medium passage 46 are open at respective end faces 16a, 16b, 16c of the valve housing 16, providing respective openings 48a, 48b, 48c. The openings 48a, 48c serve as inlet and outlet holes for the heating medium, and the remaining opening 48b is closed by a cap nut 49 as a closure member. The openings 48a, 48b, 48c are formed by cores used to form the first heating medium passage 42, the second heating medium passage 44, and the third heating medium passage 46 and machining tools.

As shown in FIG. 2, the valve seat 18 has a tubular member 50 projecting into both the inlet port 12 and the communication chamber 34, an annular flange 52 projecting radially outwardly from a circumferential side wall of the tubular member 50, and a valve seat member 54 on an upper end face of the tubular member 50. The tubular member 50 has an annular groove defined in a circumferential side wall of a portion thereof which is inserted in the inlet port 12, and an annular seal 40b is mounted in the annular groove. The annular seal 40b seals the gap between the circumferential side wall of the tubular member 50 and the inner circumferential surface of the inlet port 12.

The annular flange 52 has a plurality of through holes defined therein. Bolts 55 are threaded through the respective through holes into internally threaded holes defined in the valve housing 16, thereby fastening the valve seat 18 to the valve housing 16.

The valve seat member 54 projects annularly by a predetermined distance upwardly from the upper end face of the tubular member 50. The valve head 32 has a disk 56 which can be seated on and unseated off the valve seat member 54.

According to the present embodiment, the valve seat 18 is made of stainless steel.

The guide member 20 has a flange 58 coupled to an upper portion of the valve housing 16. The flange 58 has a hollow cylindrical stop (engaging portion) 60 projecting downwardly from a lower end face thereof. When the valve head 32 is displaced axially upwardly in unison with the movable member 30 by the solenoid 26, the disk 56 has an upper surface held against a lower end face of the stop 60. At this time, the disk 56 is engaged by the stop 60 and kept in a terminal end of its displacement stroke. The stop 60 has an axial length selected such that when the upper surface of the disk 56 is held against the lower end face of the stop 60, a land 64 on the upper end of the movable member 30 which is inserted into a recess 62 defined in the lower end of the fixing member 28 is held out of contact with the bottom of the recess 62.

The guide member 20 has an outside diameter substantially equal to the diameter of the communication chamber 34 in the valve housing 16. For assembling the guide member 20 in the upper portion of the valve housing 16, the guide member 20 is inserted into the valve housing 16 while holding an outer circumferential surface of the guide member 20 against an inner circumferential surface of the communication chamber 34. Therefore, the guide member 20 can easily be positioned and assembled in the valve housing 16. In addition, the movable member 30 disposed in the guide member 20 can easily be axially aligned with the valve seat 18.

A helical spring 66 is inserted radially inwardly of the stop 60 and interposed axially between the guide member 20 and the disk 56 of the valve head 32.

The valve housing 16 has an annular groove defined in the upper portion thereof, and an annular seal 68a is inserted in the annular groove. The annular seal 68a seals the gap between the valve housing 16 and the flange 58.

The upper end of the guide member 20 includes a relatively long guide sleeve 72 axially extending as a thin-walled hollow cylinder and inserted in a bobbin 70 to be described later. The guide sleeve 72 is slightly smaller in diameter than the stop 60.

The guide sleeve 72 defines a guide hole 74 therein for guiding the movable member 30 when it is axially displaced. The guide sleeve 72 is inserted in the bobbin 70 and the plate member 21 such that the guide sleeve 72 has an outer circumferential surface held against an inner circumferential surface of the bobbin 70 and an inner circumferential surface of the plate member 21 which defines a through hole 76 therein. The guide sleeve 72 has a distal end held against a lower end face of a large-diameter portion 78 of the fixing member 28.

An annular seal 68b is mounted in a space surrounded by an upper surface of the plate member 21, a mount hole 80 defined in the cover member 22 in which the guide sleeve 72 is inserted, and an outer circumferential surface of the guide sleeve 72. The annular seal 68b hermetically seals the interior of the solenoid 26.

The plate member 21 is in the form of an essentially annular shape and made of a magnetic metallic material. The plate member 21 is integrally joined to an upper portion of the guide member 20. The plate member 21 has a through hole 76 defined substantially centrally therethrough and extending axially therein. The guide sleeve 72 of the guide member 20 extends through the through hole 76.

A connector 82 for being electrically connected to a power supply, not shown, for supplying an electric current to the solenoid 26 is mounted on a side surface of the cover member 22 which is coupled to the upper surface of the plate member 21. The connector 82 has a terminal 84 of metal disposed therein and having an exposed end portion. The terminal 84 is electrically connected to the bobbin 70 of the solenoid 26 through the cover member 22. When the solenoid-operated valve 10 is in use, the terminal 84 is electrically connected to the power supply through leads, not shown.

The cover member 22 includes a flange 86 projecting radially inwardly from an upper end thereof. The flange 86 has an annular groove defined in an upper end face thereof and accommodating an annular seal 68c therein. The annular seal 68c seals the gap between the cover member 22 and the solenoid housing 24, i.e., hermetically seals the interior of the solenoid housing 24.

The solenoid 26 has the bobbin 70 supporting a coil 88 wound around an outer circumferential surface thereof and having an annular shape held against an inner circumferential surface of the cover member 22, the movable member 30 axially displaceable in the bobbin 70, and the fixing member 28 integrally fastened to the upper end of the solenoid housing 24 by a cap nut 90 and disposed in axially confronting relation to the movable member 30.

The bobbin 70 has a first large-diameter flange 92 and a second large-diameter flange 94 disposed respectively on lower and upper ends thereof and extending radially outwardly.

The first large-diameter flange 92 has an annular groove 96 defined in a lower surface thereof and receiving an annular protrusion 98 disposed on an upper end face of the cover member 22. The second large-diameter flange 94 has an upper end face held against a lower end face of the flange 86. Therefore, the bobbin 70 with the coil 88 wound therearound engages in the cover member 22, and is surrounded in its entirety by the cover member 22.

The bobbin 70 has an insertion hole 100 defined substantially centrally therein and extending axially therethrough. The fixing member 28 is inserted in an upper portion of the insertion hole 100, and the guide sleeve 72 of the guide member 20 is inserted in a lower portion of the insertion hole 100. As described above, the distal end of the guide sleeve 72 is held against the lower end face of the large-diameter portion 78 of the fixing member 28.

The fixing member 28 is in the form of a cylinder made of a magnetic metallic material. The fixing member 28 has an externally threaded knob 102 projecting upwardly from a substantially central area of its upper end face. The externally threaded knob 102 extends through a hole defined substantially centrally in the upper end of the solenoid housing 24, and the cap nut 90 is threaded over the externally threaded knob 102 with a washer 104 interposed therebetween, fastening the fixing member 28 integrally to the solenoid housing 24.

The fixing member 28 has the recess 62 defined substantially centrally in the lower end thereof and having a predetermined depth.

The movable member 30 is substantially in the form of a cylinder made of a magnetic metallic material. The movable member 30 is displaceable in the guide sleeve 72. The land 64 projects upwardly from a substantially central area of the upper end face of the movable member 30 which faces the fixing member 28.

The land 64 has a diameter slightly smaller than a main portion of the movable member 30. When the movable member 30 is displaced upwardly, the land 64 is inserted into the recess 62 in the fixing member 28. The axial height of the land 64 is substantially equal to or slightly smaller than the axial depth of the recess 62.

The movable member 30 has a first inner hole 106 extending centrally axially therethrough. The first inner hole 106 includes a larger-diameter portion near the flange 58 of the guide member 20, the larger-diameter portion having an internally threaded surface 108. Stated otherwise, the larger-diameter portion of the first inner hole 106 serves as an internally threaded hole.

The movable member 30 has a smaller-diameter portion 110 on its lower end which has a second inner hole 112 defined diametrically therethrough. The second inner hole 112 extends across the first inner hole 106 in communication therewith.

The valve head 32 has, in addition to the disk 56, an externally threaded shank 114 which is smaller in diameter than the disk 56. The externally threaded shank 114 is threaded in the internally threaded surface 108 (internally threaded hole) of the larger-diameter portion of the first inner hole 106, thereby coupling the valve head 32 to the movable member 30.

The disk 56 is inserted in the communication chamber 34 with a certain clearance left between the disk 56 and the inner circumferential surface of the communication chamber 34. As described above, the lower end face of the valve head 32 is seated on or unseated off the valve seat member 54, thereby closing or opening the solenoid-operated valve 10.

The disk 56 has a circular land 116 on its upper end face which has a diameter substantially identical to the inside diameter of the helical spring 66. The circular land 116 engages in the hole provided in the helical spring 66.

The externally threaded shank 114 has a third inner hole 118 extending axially therein and a fourth inner hole 120 extending diametrically therein across the third inner hole 118. The third inner hole 118 communicates with the first inner hole 106 in the movable member 30, and the fourth inner hole 120 communicates with the third inner hole 118 and the second inner hole 112.

The clearance between the movable member 30 and the fixing member 28 is held in fluid communication with the communication chamber 34 through the first inner hole 106, the third inner hole 118, the fourth inner hole 120, and the second inner hole 112.

The valve head 32 is made of an inexpensive, corrosion-resistant metallic material such as stainless steel or the like, for example.

The disk 56 has a first annular mount groove 122 defined in a lower surface thereof and having a predetermined depth in the upward direction. A first sheet 124 made of an elastic material is mounted in the first annular mount groove 122. The disk 56 also has a second annular mount groove 126 defined in an upper surface thereof and having a predetermined depth in the downward direction. A second sheet 128 made of an elastic material is mounted in the second annular mount groove 126. The elastic material of these first and second sheets 124, 128 should preferably be rubber, for example.

The first sheet 124 is disposed in a position to contact the valve seat member 54 when the disk 56 is seated on the valve seat member 54. The second seat 128 is disposed in a position to contact the tip end of the stop 60 when the disk 56 is displaced upwardly until its upper end face contacts the stop 60.

The first annular mount groove 122 and the second annular mount groove 126 communicate with each other through a communication hole 130 that is defined axially through the disk 56. The first sheet 124 and the second sheet 128 are integrally joined to each other by a joint sheet 132 made of an elastic material which fills the communication hole 130. Specifically, the first sheet 124 and the second sheet 128 are formed when the elastic material is introduced to fill the first annular mount groove 122 and the second annular mount groove 126 and then solidified. For example, when the first annular mount groove 122 is introduced to fill the first annular mount groove 122, it is also introduced to fill the second annular mount groove 126. The first sheet 124, the joint sheet 132, and the second sheet 128 can easily be integrally formed and hence mounted simply and efficiently in position.

Since the first sheet 124, the joint sheet 132, and the second sheet 128 are integrally formed with each other, the first sheet 124 and the second sheet 128 are prevented from being dislodged from the first annular mount groove 122 and the second annular mount groove 126, respectively.

The helical spring 66 that is interposed axially between the upper end face of the disk 56 and the lower end face of the guide member 20 exerts resilient forces to normally urge the vale head 32 in a direction to be seated on the valve seat member 54. The helical spring 66 is prevented from being dislodged from the disk 56 by having its lower end fitted over the circular land 116 of the disk 56.

The solenoid housing 24 is made of a magnetic metallic material, and is mounted to surround the cover member 22 from above.

The solenoid-operated valve 10 according to the embodiment of the present invention is basically constructed as described above. Operation and advantages of the solenoid-operated valve 10 will be described in detail below.

In the fuel cell system 200 shown in FIG. 1, the solenoid-operated valve 10 is disposed at an appropriate position in an air discharge passage interconnecting the air discharge port 210 and the air discharger 208 or a passage between the hydrogen discharge port 218 and the hydrogen discharger 216.

FIG. 2 shows the solenoid-operated valve 10 as it is closed when the coil 88 is not supplied with an electric current, i.e., when the coil 88 is not energized, and the disk 56 (the first sheet 124) of the valve head 32 coupled to the distal end of the movable member 30 is seated on the valve seat member 54, holding the inlet port 12 and the outlet port 14 out of communication with each other.

When the non-illustrated power supply is turned on to supply an electric current to the coil 88 through the terminal 84 of the connector 82, the coil 88 is energized to generate magnetic fluxes which flow from the coil 88 to the movable member 30 and then back to the coil 88.

Under the magnetic forces, the movable member 30 is now displaced axially upwardly against the resilient forces from the helical spring 66, displacing the valve head 32 coupled to the distal end of the movable member 30 until finally the disk 56 (the first sheet 124) of the valve head 32 is unseated off the valve seat member 54.

The end of the displacement stroke of the valve head 32 is reached when the second sheet 128 mounted on the disk 56 contacts the stop 60 of the guide member 20. Shocks produced when the disk 56 is displaced to the end of the displacement stroke of the valve head 32 are dampened by the second sheet 128 of the elastic material, and hence noise generated when the second sheet 128 contacts the stop 60 is reduced. At the same time, the land 64 of the movable member 30 is inserted into the recess 62 in the fixing member 28.

When the disk 56 is thus unseated off the valve seat member 54, the solenoid-operated valve 10 is opened. A reaction gas and/or residual water is introduced from the inlet port 12, flows through the clearance between the disk 56 and the inner circumferential surface of the communication chamber 34 into the valve housing 16, and is then discharged from the valve housing 16 through the outlet port 14.

To stop discharging the reaction gas and/or residual water, the electric current supplied from the non-illustrated power supply to the coil 88 is stopped to de-energize the coil 88. The forces which have been applied to displace the movable member 30 upwardly are eliminated, and at the same time the movable member 30 is resiliently urged to move downwardly by the helical spring 66, displacing the second sheet 128 on the disk 56 of the valve head 32 off the lower end face of the stop 60. The disk 56 is seated on the valve seat member 54, bringing the inlet port 12 and the outlet port 14 out of communication with each other. The parts of the solenoid-operate valve 10 are now back to the position shown in FIG. 2.

At this time, the first seat 124 mounted in the first annular mount groove 122 in the disk 56 is held in close contact with the upper surface of the valve seat member 54, hermetically sealing the communication chamber 34 reliably.

The reaction gas and/or residual water stops being discharged from the air supply passage or the hydrogen supply passage through the solenoid-operate valve 10.

While the movable member 30 and the valve head 32 are being displaced upwardly, the fluid that is present in the clearance between the fixing member 28 and the movable member 30 quickly flows through the first inner hole 106, the third inner hole 118, the fourth inner hole 120, and the second inner hole 112 into the communication chamber 34. Therefore, the fluid does not remain trapped in the clearance between the fixing member 28 and the movable member 30, and hence the movable member 30 is not pressed and is not prevented from being displaced by a trapped fluid.

While the movable member 30 and the valve head 32 are being displaced downwardly, the fluid quickly flows from the communication chamber 34 through the second inner hole 112, the fourth inner hole 120, the third inner hole 118, and the first inner hole 106 into the clearance between the fixing member 28 and the movable member 30. Therefore, the movable member 30 and the valve head 32 are quickly displaced downwardly by being pressed by the fluid introduced into the clearance.

With the first inner hole 106 and the second inner hole 112 being defined in the movable member 30 and also with the third inner hole 118 and the fourth inner hole 120 being defined in the valve head 32 coupled to the movable member 30, the movable member 30 and the valve head 32 can quickly be displaced, and hence the disk 56 of the valve head 32 can quickly be seated on and unseated off the valve seat member 54. As a consequence, the speed of response of the solenoid-operated valve 10 is increased.

Furthermore, since the first inner hole 106 is defined centrally axially through the movable member 30, but not in a circumferential side wall thereof, the area of a magnetic path provided by the movable member 30 and facing the bobbin 70 is not reduced. Therefore, necessary forces are achieved for displacing the movable member 30.

While the solenoid-operated valve 10 is in operation, the heating medium such as hot water or the like flows through the first heating medium passage 42, the second heating medium passage 44, and the third heating medium passage 46. Since the first heating medium passage 42, the second heating medium passage 44, and the third heating medium passage 46 are defined in surrounding relation to the communication chamber 34 as described above, even if a wet reaction gas and/or residual water is introduced into the communication chamber 34 when the vehicle incorporating the fuel cell system 200 is driven at low temperatures such as in a cold climate or the winter, the wet reaction gas and/or residual water is prevented from being frozen in the communication chamber 34.

The first heating medium passage 42 and the second heating medium passage 44, and the second heating medium passage 44 and the third heating medium passage 46 are straight in shape, and extend perpendicularly to each other (see FIG. 3). These straight and perpendicular passages 42, 44, 46 can easily be formed by a usual machining process. According to the present embodiment, therefore, since the first heating medium passage 42, the second heating medium passage 44, and the third heating medium passage 46 are straight in shape, they can easily be formed by a simple machining process. In addition, water is prevented from being frozen in these passages 42, 44, 46.

Inasmuch as the opening 48b is closed off by the cap nut 49, the heating medium is prevented from leaking from the opening 48b.

According to the present embodiment, the valve head 32 and the movable member 30 are separate members, and the valve head 32 is made of an inexpensive, corrosion-resistant metallic material such as stainless steel or the like, for example. Consequently, when the solenoid-operated valve 10 operates as described above, even if a wet reaction gas and/or residual water is introduced into the solenoid-operated valve 10, the valve head 32 is prevented from being corroded. The solenoid-operated valve 10 is thus highly durable and has a long service life.

In conventional solenoid-operated valves, the valve seat is usually formed integrally in the valve housing. According to the present embodiment, however, the valve housing 16 and the valve seat 18 are separate members, and the valve housing 16 is made of aluminum and the valve seat 18 is made of stainless steel. Because the valve housing 16 is made of aluminum, the solenoid-operated valve 10 is light in weight. The valve seat 18 of stainless steel is also corrosion-resistant as with the valve head 32. Therefore, the durability of the solenoid-operated valve 10 is further increased.

As the valve seat 18 is made of stainless steel, a water-repellant film can be formed relatively easily on the valve seat member 54. Even if a wet reaction gas and/or residual water is introduced into the communication chamber 34, liquid droplets are prevented from being deposited on the valve seat member 54 by the water-repellant film. Therefore, the valve seat member 54 is reliably prevented from being corroded, and is also prevented from sticking to the first sheet 124 due to frozen water on the valve seat member 54.

The cost of the solenoid-operated valve 10 is reduced because the valve head 32 and the valve seat 18 are made of inexpensive stainless steel.

The valve head 32 may possibly need to be replaced because of aging for use over a long period of time. When such a need arises, the valve head 32 can easily be replaced because the valve head 32 is fastened to the movable member 30 by threaded engagement. Since only the valve head 32 needs to be replaced, the running cost of the solenoid-operated valve 10 is lower than would be if a movable member integrally formed with a valve head needed to be replaced.

The movable member 30 is in the form of a relatively simple cylinder. Therefore, the movable member 30 can be handled more easily than a conventional movable member integrally formed with a valve head of complex shape as with the valve head 32. When a fluorine coating is to be applied to the circumferential side wall of the movable member 30, for example, it is easy to prevent hit marks and scratches from being formed on the movable member 30.

According to the present embodiment, the stop 60, the flange 58, and the guide sleeve 72 are integrally formed with each other as the guide member 20, i.e., a unitary member. Consequently, the number of parts of the solenoid-operated valve 10 is smaller than would be if the stop 60, the flange 58, and the guide sleeve 72 were separate from each other. In addition, the guide member 20 can be assembled highly efficiently in the cover member 22, the valve housing 16, and the plate member 21, and the man-hours required to assemble the guide member 20 in the cover member 22, the valve housing 16, and the plate member 21 are reduced.

The guide member 20 is inserted into the valve housing 16 while holding the outer circumferential surface of the guide member 20 against the inner circumferential surface of the communication chamber 34. Therefore, the guide member 20 can reliably be positioned in the valve housing 16. In addition, the movable member 30 disposed for axial movement in the guide member 20, and hence the disk 56 of the valve head 32 can easily be axially aligned with the valve seat 18 coupled to the valve housing 16 for increased assembled accuracy. Therefore, they can be assembled efficiently and accordingly the man-hours required to assemble them are reduced.

Moreover, the guide sleeve 72 shaped as a hollow cylinder inserted in the bobbin 70 is disposed on the upper surface of the flange 58 of the guide member 20, and the movable member 30 is displaceably inserted in the guide hole 74 in the guide sleeve 72. Consequently, since the movable member 30 is axially guided in the guide hole 74, the movable member 30 is displaced reliably axially.

Although a certain preferred embodiment of the present invention has been shown and described in detail, it should be understood that various changes and modifications may be made therein without departing from the scope of the appended claims.

What is claimed is:

1. A solenoid-operated valve for discharging a reaction gas and/or residual water from fuel cells, comprising:

a valve housing having an inlet port for introducing the reaction gas and/or residual water and an outlet port for discharging the reaction gas and/or residual water introduced from said inlet port, said valve housing having a communication chamber defined therein between said inlet port and said outlet port;

a valve seat disposed in said communication chamber and coupled to said valve housing;

a solenoid housing coupled to said valve housing;

a solenoid disposed in said solenoid housing for being energized by an electric current supplied thereto;

a fixing member disposed in said solenoid;

a movable member having an end facing said fixing member, wherein said movable member has a first inner hole defined axially therein and a second inner hole defined diametrically therein in communication with said first inner hole, said movable member being displaceable toward or away from said fixing member when said solenoid is energized;

a valve head coupled to an opposite end of said movable member, wherein said valve head has a first inner hole defined axially therein in communication with said first inner hole of the movable member and a second inner hole defined diametrically therein in communication with said second inner hole of the movable member and said first inner hole of the valve head, said valve head being seatable on or away from said valve seat when said movable member is displaced; and a guide member disposed in said valve housing and said solenoid and having a guide hole, said movable member being inserted in said guide hole, said guide member having an engaging portion for limiting said valve head against displacement in a direction away from said valve seat.

2. A solenoid-operated valve according to claim 1, wherein said movable member and said valve head are coupled to each other by threaded surfaces thereof.

3. A solenoid-operated valve according to claim 1, wherein said valve housing is made of aluminum or aluminum alloy, and said valve seat is made of a material different from said valve housing.

4. A solenoid-operated valve according to claim 3, wherein said valve seat is made of stainless steel.

5. A solenoid-operated valve according to claim 1, wherein said valve housing has a heating medium passage defined therein for passage of a heating medium therethrough.

6. A solenoid-operated valve according to claim 5, wherein said valve housing has a plurality of heating medium passages defined therein, said heating medium passages extending perpendicularly to each other and surrounding said communication chamber.

7. A solenoid-operated valve according to claim 6, wherein one of said heating medium passages has an opening at an end thereof which is open at an end face of said valve housing, said opening being closed by a closure member.

8. A solenoid-operated valve according to claim 1, wherein said valve head and said movable member are made of different materials.

9. A solenoid-operated valve according to claim 8, wherein said valve head is made of stainless steel.

10. A solenoid-operated valve according to claim 1, further comprising:
a first sheet mounted on said valve head, said first sheet being made of an elastic material and disposed in a position to contact said valve seat when said valve head is seated on said valve seat; and
a second sheet mounted on said valve head, said second sheet being made of an elastic material and disposed in a position to contact said engaging portion of said guide member.

11. A solenoid-operated valve according to claim 10, wherein said valve head has first and second mount grooves defined therein, said first sheet and said second sheet being mounted respectively in said first and second mount grooves, said first sheet and said second sheet being integrally joined to each other by a joint sheet made of an elastic material and filling a communication hole defined in said valve head and communicating between said first and second mount grooves.

12. A solenoid-operated valve according to claim 1, further comprising a filter mounted in said inlet port.

13. A solenoid-operated valve according to claim 1, wherein said guide member has an outside diameter which is substantially the same as an inside diameter of said communication chamber.

14. A solenoid-operated valve according to claim 1, wherein said valve seat and said valve housing are coupled to each other by bolts.

15. A solenoid-operated valve according to claim 1, wherein said movable member is of a cylindrical shape.

* * * * *